United States Patent

[11] 3,608,570

| [72] | Inventors | Serge N. McKhann<br>425 E. 63rd St., New York, N.Y. 10021;<br>William T. Bahr, 1465 Tuttle Ave.,<br>Wallingford, Conn. 06492 |
|---|---|---|
| [21] | Appl. No. | 802,990 |
| [22] | Filed | Feb. 27, 1969 |
| [45] | Patented | Sept. 28, 1971 |

| [54] | VALVE UNIT<br>5 Claims, 7 Drawing Figs. | |
|---|---|---|
| [52] | U.S. Cl. | 137/75,<br>251/149.6 |
| [51] | Int. Cl. | F16k 17/38 |
| [50] | Field of Search | 137/72–77,<br>614.03, 614.05, 223, 231, 322; 220/89 B; 222/54;<br>122/504.1, 504.3; 251/149.1, 149.6, 149, 149.4,<br>149.7, 149.8, 149.9 |

[56] References Cited
UNITED STATES PATENTS

| 973,260 | 10/1910 | Creighton | 137/75 |
|---|---|---|---|
| 2,923,567 | 2/1960 | Jones et al. | 251/149 X |
| 805,125 | 11/1905 | English | 137/75 |
| 1,771,716 | 7/1930 | Lovekin | 137/77 |
| 2,028,149 | 1/1936 | Goldsmith | 137/77 |
| 2,247,843 | 7/1941 | Kamenarovic | 251/149.6 X |
| 3,245,423 | 4/1966 | Hansen et al. | 137/74 |

*Primary Examiner*—M. Cary Nelson
*Assistant Examiner*—Richard Gerard
*Attorney*—Thomas R. Boland ABSTRACT: A valve unit is provided having an external fusible safety cutoff means. The unit is generally utilized as part of quick-disconnect couplings used in connecting lines containing combustible fluids, such as gas. The valve unit functions as a plug part and is provided with a rod member adapted at one end to engage a self-closing valve contained in a communicating socket part, which self-closing valve may be disposed to close the flow of fluid through said socket part, and having a flange at the other end in contact with, and constrained by, a fusible material. The fusible material constitutes an outside wall of said unit or is in the form of a ring which bonds the flange to the housing. When the temperature of the surrounding area reaches a predetermined degree, the material fuses, losing its constraining influence on the rod member which is then pushed outward allowing the self-closing valve to shut off the flow of fluid through the line.

INVENTORS,
SERGE N. McKHANN
WILLIAM T. BAHR

INVENTORS,
SERGE N. McKHANN
WILLIAM T. BAHR

VALVE UNIT

BACKGROUND OF THE INVENTION

Valve couplings are used extensively in connecting lines which transport fluids including those of a combustible nature. In the case of combustible fluids it is particularly important that the coupling be provided with a safety means which will automatically cut off the flow of fluid when the temperature of the surrounding area reaches a level which may cause fire or explosion. It has been shown in the past that fusible material may be used as such a safety means but in each instance of the prior art, this fusible material is disposed in the internal portion of the coupling. In such a position the material is less sensitive to the surrounding temperature and fuses only when the outside heat has far surpassed the danger level.

SUMMARY OF THE INVENTION

Accordingly, it is an object of the present invention to provide a valve unit, having an external fusible safety means, which responds to a predetermined temperature so as to permit the automatic shutoff of combustible fluid in a line.

Another object of this invention is to provide a new and improved plug valve unit which may be inserted in a communicating socket part containing a self-closing valve member, whereby the self-closing valve is held open against the action of a spring but allowed to close when the temperature of the surrounding area reaches a predetermined level.

A further object of the present invention is to provide a valve unit having an external fusible safety means, which may be conveniently inserted in a communicating wall socket located in a narrow area.

These and other objects of the present invention are accomplished by providing an L-shaped plug type valve unit adapted to engage at one end said self-closing valve member in an open position when connected, and having a flange at the other end in contact with an constrained by a fusible material which constitutes an external wall of the unit. In one form, the rod member is held in place by an apertured guide portion which supports and prevents jamming of the rod when the material fuses. In a preferred form, the rod member is held in place by the fusible material which is in the form of a ring and bonds the flange to the valve unit housing.

DETAIL DESCRIPTION OF THE PREFERRED EMBODIMENTS

Figure 1:
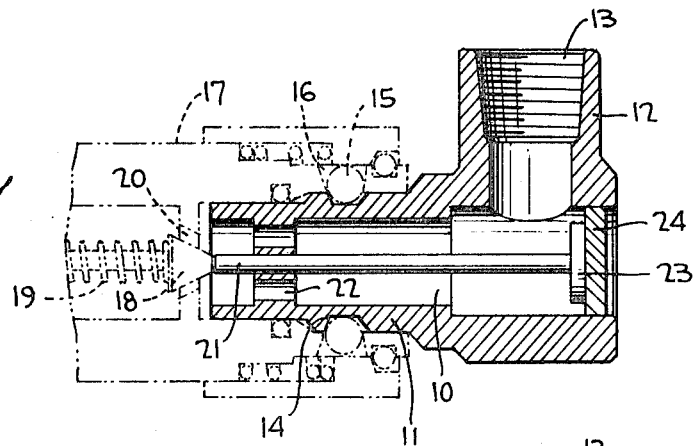
FIG. 1 is a cross-sectional view of a plug type valve unit embodying the present invention.

Referring to the drawing, FIG. 1 shows an L-shaped plug unit having a passageway 10 extending therethrough to form a fluid conduit. A nose portion 11 is formed at one end and the other end 12 is threaded internally 13 so as to provide means for connecting the unit to a flexible or similar type of line.

The nose portion 11 has an annular groove 14 adapted to receive ball detents 15 which are disposed in individual openings 16 in the wall of a cooperating socket unit 17 (shown in phantom). The socket unit has not been described in detail since it is prior art. When the plug unit is inserted in the socket unit 17 a self-closing valve 18, biased by a spring 19 is moved away from its tapered seat 20 by a rod member 21 disposed in passageway 10 which engages the valve in an open position.

The rod member 21 is slideably disposed in an apertured sleeve portion 22 which is fixed in position in the passageway 10 by any suitable means, such as welding or soldering. A flange 23 is formed at one end of the rod member 21 which is in contact with and constrained by a fusible material 24 which constitutes an external wall of the plug unit. The material 24 will fuse when the surrounding temperature reaches a predetermined level thereby allowing the rod member 21 to move in the passageway 10 under the action of the spring 19 on the valve 18 which then closes and shuts off the flow of fluid. The sleeve portion 22 guides the rod member axially and prevents it from jamming when the material 24 has fuses. It will be appreciated that the L-shaped configuration of the plug unit permits easy coupling with a wall socket unit when the connecting line is somewhat inflexible and only a narrow space is provided.

Figure 2:
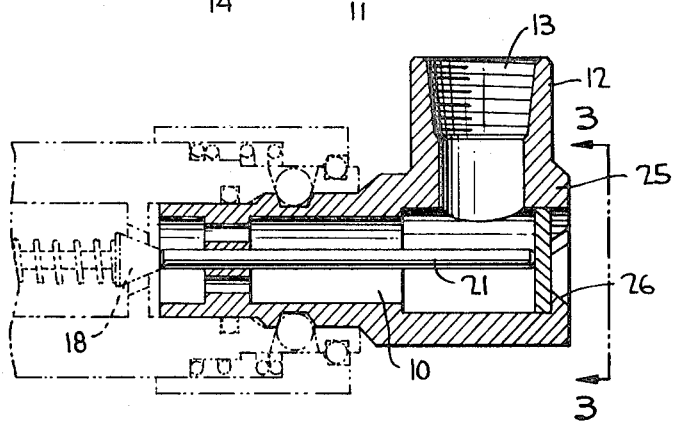
FIG. 2 is a cross-sectional view of another embodiment of the present invention.
Figure 3:
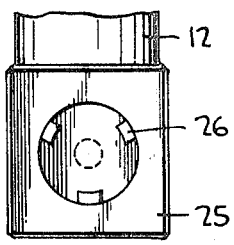
FIG. 3 is a top plan view of FIG. 2 taken along line 3—3.

Referring to FIG. 2, the fusible material 24 is indented in the wall 25 of the plug unit and supported by diametrically opposed tabs 26 which project from the wall as is best shown in FIG. 3.

Figure 4:
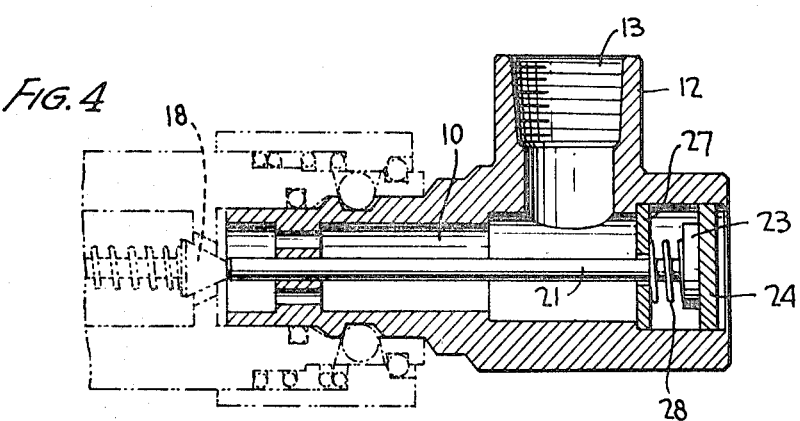
FIG. 4 is a cross-sectional view of a further embodiment of the present invention.

The embodiment shown in FIG. 4 is also generally corresponding to FIG. 1 except it shows a sleeve 27 which functions as a backstop for a release spring 28 which presses against the flange 23 constrained by the fusible material 24. When the material fuses the rod member 21 will move outward from the passageway 10 under the action of the release spring 28. Therefore, it will be appreciated that the rod member will move independent of the biased action of the self-closing valve 18.

Figure 5:
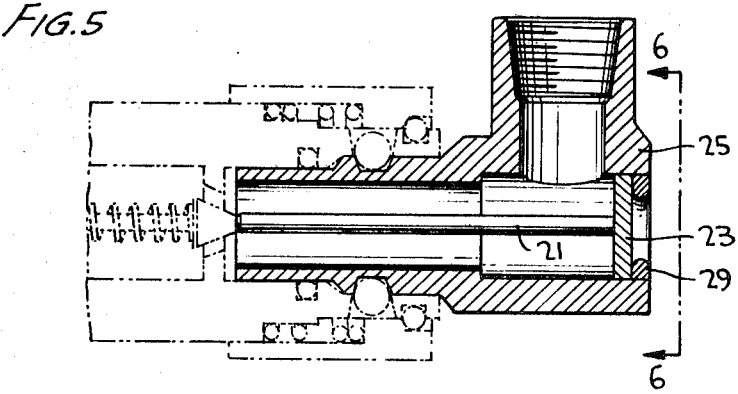
FIG. 5 is a cross-sectional view of a different form of the present invention.
Figure 6:
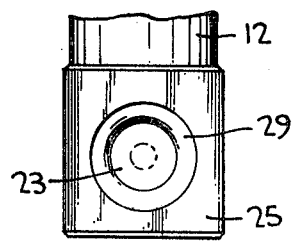
FIG. 6 is a top plan view of FIG. 5 taken along line 6—6.

FIG. 5 shows a modified form of FIG. 2 in which the tabs 26 and the sleeve portion 22 shown in FIG. 2 have been removed. Instead, the rod member 21 is supported by the flange 23 which is bonded to the housing 25 by a ring of fusible material 29 as best shown in FIG. 6. In this form, the middle portion of the flange will constitute an outside wall of the unit.

Figure 7:
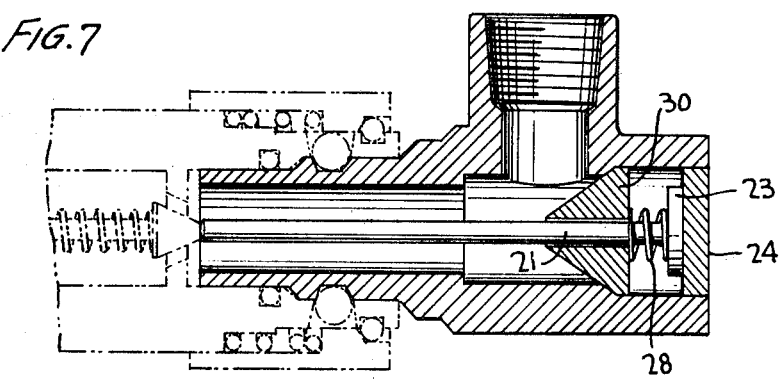
FIG. 7 is a cross-sectional view of a modified form of FIG. 4.

The embodiment shown in FIG. 7 generally corresponds to FIG. 4 except it shows a backstop 30 in a conical shape and the apertured sleeve 22 of FIG. 4 has been removed. The conical shape of the backstop serves to support the rod member 21 when the material 24 fuses.

The principle, preferred embodiments and modes of operation of the present invention have been described in the foregoing specification. However, it should be understood that the invention which is intended to be protected herein may be practiced otherwise than as described without departing from the appended claims.

What is claimed is:

1. A valve unit comprising an L-shaped housing having a nose portion adapted for coupling in a fluid line formed therethrough, a rod member axially disposed in said nose portion of said housing and having a flange formed at one end, the opposite end being adapted to engage a self-closing valve and unseat same, an apertured sleeve in the line of said nose portion slideably receiving and supporting said rod member, said sleeve providing for fluid flow through said line, fusible material at one end of said nose portion adapted to fuse at a predetermined temperature constituting a wall portion of said housing and being in contact with said flange end of said rod member so as to constrain said rod, the dimensions of said flange and fusible material being such that upon said predetermined temperature being reached, said wall portion fuses thereby releasing said rod for longitudinal movement.

2. A valve unit as defined in claim 1 wherein said nose portion of said housing includes an annular groove adapted to receive locking means in a socket unit.

3. A valve unit as defined in claim 1 wherein said fusible material is indented in said housing, and supported by tabs projecting from said housing.

4. A valve unit comprising an L-shaped housing having a nose portion and a fluid line formed therethrough, a rod member axially disposed in said nose portion of said housing and having a flange formed at one end the opposite end being adapted to engage a self-closing valve and unseat same, an apertured sleeve in the line of said nose portion slideably receiving and supporting said rod member, said sleeve providing for fluid flow through said line, a backstop forming an internal wall in said line and having a central opening slideably receiving said rod member, a helical spring surrounding said rod, bearing against said backstop and pressing said flange outward, fusible material at one end of said nose portion adapted to fuse at a predetermined temperature forming an external wall portion of said housing and being in contact with said flange so as to constrain said rod, the dimensions of said flange and fusible material being such that upon said predetermined temperature being reached said wall portion fuses thereby releasing said rod for longitudinal movement.

5. A valve unit comprising an L-shaped housing having a nose portion and a fluid line formed therethrough, a rod member axially disposed in said nose portion of said housing and having a flange formed at one end the opposite end being adapted to engage a self-closing valve and unseat same, a backstop forming an internal wall portion in said line and having a central opening slideably receiving said rod member, said backstop being in a conical shape so as to support said rod member, a helical spring surrounding said rod, bearing against said backstop and pressing said flange outward, fusible material at one end of said nose portion adapted to fuse at a predetermined temperature forming an external wall portion of said housing and being in contact with said flange so as to constrain said rod, the dimensions of said flange and fusible material being such that upon said predetermined temperature being reached, said wall portion fuses thereby releasing said rod for longitudinal movement.